(12) United States Patent
Sodagar

(10) Patent No.: US 12,225,070 B2
(45) Date of Patent: *Feb. 11, 2025

(54) EXTENDED W3C MEDIA EXTENSIONS FOR PROCESSING DASH AND CMAF INBAND EVENTS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,666

(22) Filed: Dec. 19, 2023

(65) Prior Publication Data
US 2024/0121287 A1 Apr. 11, 2024

Related U.S. Application Data

(63) Continuation of application No. 17/495,299, filed on Oct. 6, 2021, now Pat. No. 11,882,170.
(Continued)

(51) Int. Cl.
*H04L 65/75* (2022.01)
*H04L 65/61* (2022.01)
(Continued)

(52) U.S. Cl.
CPC ............ *H04L 65/765* (2022.05); *H04L 65/61* (2022.05); *H04L 65/65* (2022.05); *H04L 65/80* (2013.01);
(Continued)

(58) Field of Classification Search
CPC ............ H04N 21/435; H04N 21/8456; H04N 21/85406; H04N 21/858; H04L 65/765; H04L 65/61; H04L 65/65; H04L 65/80
See application file for complete search history.

(56) References Cited

U.S. PATENT DOCUMENTS

2014/0365556 A1* 12/2014 Rehan ................... H04L 65/756
709/203
2015/0026358 A1* 1/2015 Zhang .............. H04N 21/23439
709/231
(Continued)

FOREIGN PATENT DOCUMENTS

WO 2017038065 A1 3/2017

OTHER PUBLICATIONS

Communication dated Dec. 5, 2023 in Japanese Patent Application No. 2022-562445.
(Continued)

*Primary Examiner* — Emmanuel L Moise
*Assistant Examiner* — Robert A Shaw
(74) *Attorney, Agent, or Firm* — Sughrue Mion, PLLC

(57) ABSTRACT

There is included a method and apparatus comprising computer code configured to cause a processor or processors to perform obtaining media data, generating, from the media data, one or more event segments, appending the one or more event segments, to a first event processing buffer, the one or more event segments comprising an event start offset for each of the one or more event segments based on a time at which the each of the one or more event segments is appended to the first event processing buffer, appending the one or more event segments, to a second event processing buffer, the one or more event segments comprising event dispatch information for the each of the one or more event segments, and dispatching the one or more event segments based on the first event processing buffer and the event dispatch information in the second event processing buffer.

20 Claims, 11 Drawing Sheets

Related U.S. Application Data

(60) Provisional application No. 63/176,748, filed on Apr. 19, 2021.

(51) Int. Cl.

| | | |
|---|---|---|
| *H04L 65/65* | (2022.01) | |
| *H04L 65/80* | (2022.01) | |
| *H04N 21/435* | (2011.01) | |
| *H04N 21/845* | (2011.01) | |
| *H04N 21/854* | (2011.01) | |
| *H04N 21/858* | (2011.01) | |

(52) U.S. Cl.
CPC ....... *H04N 21/435* (2013.01); *H04N 21/8456* (2013.01); *H04N 21/85406* (2013.01); *H04N 21/858* (2013.01)

(56) References Cited

U.S. PATENT DOCUMENTS

| | | | |
|---|---|---|---|
| 2016/0182593 | A1 | 6/2016 | Denoual |
| 2016/0323348 | A1* | 11/2016 | Bradbury ............... H04L 65/611 |
| 2017/0201761 | A1* | 7/2017 | Walker ................ H04N 21/8456 |
| 2018/0210756 | A1 | 7/2018 | Ranganathan |
| 2019/0281100 | A1* | 9/2019 | Lo ......................... H04L 65/612 |
| 2019/0312797 | A1* | 10/2019 | Sen ........................ H04W 24/08 |
| 2019/0342356 | A1* | 11/2019 | Thomas ............. H04N 21/8458 |
| 2020/0275148 | A1* | 8/2020 | Stockhammer .... H04N 21/2668 |
| 2021/0006871 | A1 | 1/2021 | Sodagar |
| 2021/0099506 | A1 | 4/2021 | Sodagar |
| 2021/0099509 | A1 | 4/2021 | Sodagar |
| 2021/0211483 | A1* | 7/2021 | Luby ................ H04N 21/25808 |
| 2021/0211782 | A1* | 7/2021 | Mekuria ................. H04L 65/70 |
| 2022/0167025 | A1* | 5/2022 | Denoual ............. H04N 21/854 |
| 2022/0191584 | A1* | 6/2022 | Toullec ............ H04N 21/23439 |

OTHER PUBLICATIONS

DASH Player's ApplicationEvents and Timed Metadata Processing Models and APIs, [online], Jun. 14, 2019, [searched on Nov. 27, 2020], Internet <URL:https://dashif-documents.azurewebsites.net/Events/master/event.html>.

International Search Report issued Feb. 1, 2022 in International Application No. PCT/US2021/054125.

Written Opinion of the International Searching Authority issued Feb. 1, 2022 in International Application No. PCT/US2021/054125.

"DASH Player's Application Events and Timed Metadata Processing Models and APIs", DASH Industry Forum, Mar. 20, 2020, https://dashif-documents.azurewebsites.net/Events/master/event.html (21 pages total).

Iraj Sodagar, "DASH TuC: A single simplified event processing model and dispatch mode for DASH inband and MPD", Tencent America, ISO/IEC JTC1/SC29/WG11, M46216, Jan. 2019 (12 pages).

Iraj Sodagar, "Text of ISO/IEC 23009-1 4th edition DAM 1 CMAF support, events processing model and other extensions", Systems, ISO/IEC JTC 1/SC 29/WG 11, N19508, May 7, 2020, (58 Pages).

Extended European Search Report dated Jul. 6, 2023 in Application No. 21925106.3.

Kilroy Hughes et al., "International Organisation for Standardisation Organisation Internationale De Normalisation ISO/IEC JTC1/SC29/WG11 Coding of Moving Pictures and Audio", ISO/IEC JTC1/SC29/WG11 MPEG117/16819, 2017 (144 pages).

Media Source Extensions ™, "W3C Recommendation", Nov. 17, 2016 (77 pages).

"DASH-IF Implementation Guidelines: DASH events and timed metadata tracks timing and processing model and client reference model", DASH Industry Forum, Version 1.0.2 (Final), Jul. 10, 2020 (21 pages).

"Text of ISO/IEC FDIS 23009-1 4th edition", ISO/IEC JTC 1/SC 29/WG 11 N18609, Coding of moving pictures and audio, 2019, pp. 1-277 (287 pages total).

DASH Industry Forum, "DASH Player's Application Events and Timed Metadata Processing Models and APIs, (Community Review)", Jun. 28, 2019 (17 pages total).

Office Action issued May 8, 2024 in Korean Application No. 10-2022-7039653.

* cited by examiner

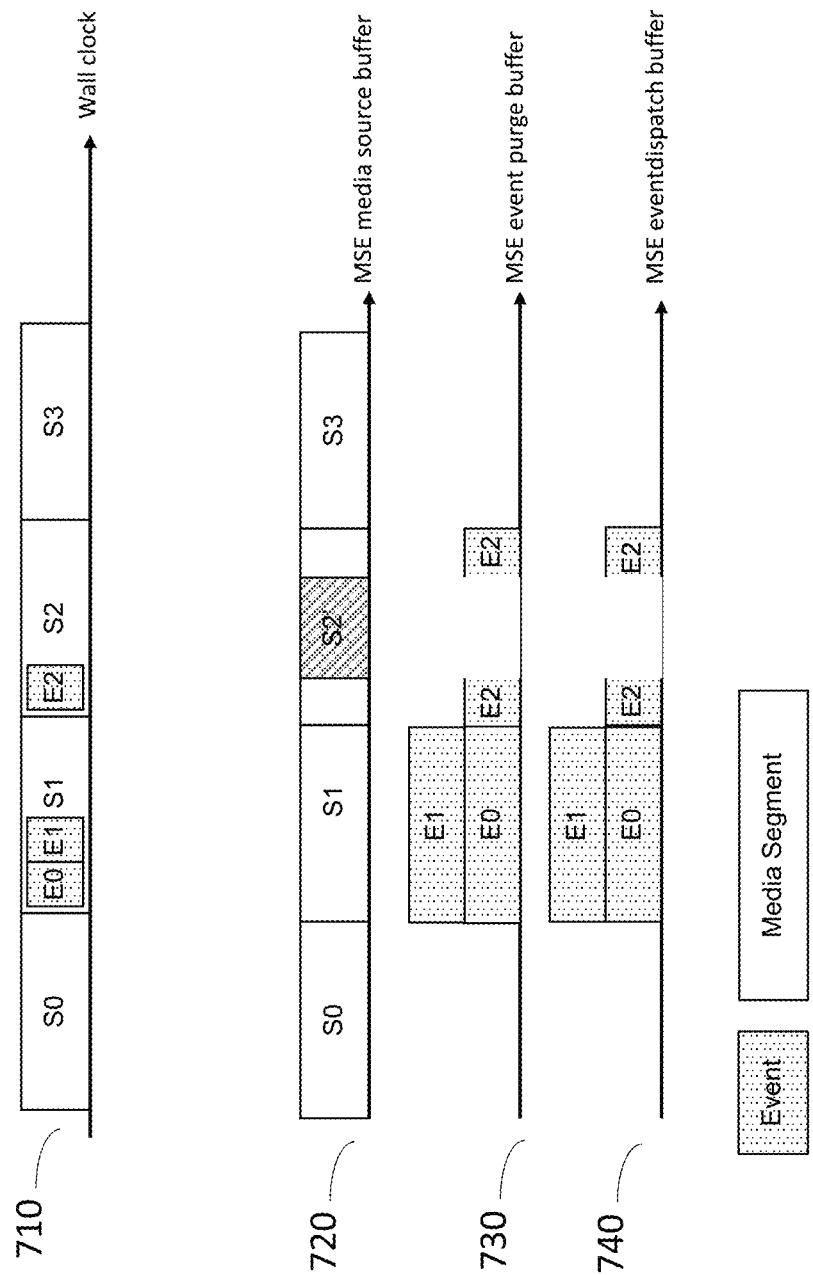

EXTENDED W3C MEDIA EXTENSIONS FOR PROCESSING DASH AND CMAF INBAND EVENTS

CROSS REFERENCE TO RELATED APPLICATION

The present application is a Continuation of U.S. application Ser. No. 17/495,299 filed Oct. 6, 2021, which claims priority to provisional application U.S. 63/176,748, filed on Apr. 19, 2021, the contents of which are hereby expressly incorporated by reference, in their entirety, into the present application.

FIELD

Embodiments of the present disclosure are directed to the streaming media content, and more particularly to streaming media content in accordance with Moving Picture Experts Group (MPEG) dynamic adaptive streaming over hypertext transfer protocol (DASH).

BACKGROUND

MPEG DASH provides a standard for streaming media content over IP networks. In MPEG DASH, media presentation description (MPD) and inband events are used for delivering media timeline related events to a client. DASH provides a mechanism for media segments to carry inband events. Similarly, Common Media Application Format (CMAF) provides a mechanism for CMAF chunks to carry inband events. One popular DASH event is inband MPD validity expiration events. Other events include application events such as SCTE-35 ("Digital Program Insertion Cueing Message for Cable") events.

Streaming players, including DASH players, use Media Source Extensions (MSE), which allow browsers or user agents to process media segments. However, current MSE specifications do not support parsing and processing inband events embedded in DASH or CMAF media segments. A browser or user agent, utilizing the current MSE specifications is unable to natively process DASH or CMAF inband events and dispatch the inband events to the respective application.

SUMMARY

The present disclosure addresses one or more technical problems. The present disclosure provides technical solutions that enable a MSE to natively process DASH and CMAF inband event boxes. The present disclosure provides technical solutions allowing a MSE to parse and process DASH or CMAF inband events contained in media segments. Thus, browsers or user agents utilizing a MSE based on the present disclosure are able to natively process DASH and CMAF inband event boxes and send them to the respective application.

The present disclosure also addresses time synchronization between inband events and the respective application. Previous methods include using an event's start time in the MSE while processing an event in an application. However, such previous methods require maintaining a common time reference. The present disclosure provides an alternative way for time synchronization using an offset start time indicating an event's start time based on the dispatch time. Using the offset time reduces network overhead, server computational overhead, and application computational overhead.

Embodiments of the present disclosure provides solutions that enable a MSE to natively process DASH and CMAF inband event boxes contained in media segments.

The present disclosure includes a method and apparatus comprising memory configured to store computer program code and a processor or processors configured to access the computer program code and operate as instructed by the computer program code. The computer program code comprises first obtaining code configure to cause the at least one processor to obtain media data, first generating code configured to cause the at least one processor to generate, from the media data, one or more event segments, first appending code configured to cause the at least one processor to append the one or more event segments, to a first event processing buffer, the one or more event segments comprising an event start offset for each of the one or more event segments based on a time at which the each of the one or more event segments is appended to the first event processing buffer, second appending code configured to cause the at least one processor to append the one or more event segments, to a second event processing buffer, the one or more event segments comprising event dispatch information for the each of the one or more event segments, and first dispatching code configured to cause the at least one processor to dispatch the one or more event segments based on the first event processing buffer and the event dispatch information in the second event processing buffer.

According to exemplary embodiments, the of the one or more event segments to the first event processing buffer causes the each of the one or more event segments to align respective presentation time and duration of the each of the one or more event segments with respective presentation time and duration of at least one associated media sample in a media buffer.

According to exemplary embodiments, the appending of the one or more event segments to the second event processing buffer comprises duplicating the appending of the one or more event segments to the first event processing buffer.

According to exemplary embodiments, the appending of the one or more event segments to the second event processing buffer is based on the event dispatch information for the each of the one or more event segments.

According to exemplary embodiments, the event dispatch information comprises information indicating at least one of event initialization, event appending, event purging, event duration, or event overwrite.

According to exemplary embodiments, the first dispatching code further comprises a first determining code configured to cause the at least one processor to determine whether the one or more event segments is included in a dispatch event table, and based on determining that the one or more event segments is not included in the dispatch event table, second dispatching code configured to cause the at least one processor to dispatch the one or more event segments to an application.

According to exemplary embodiments, the computer program code further comprises first addition code configured to cause the at least one processor to add the one or more event segments to a dispatch event table, after dispatching the one or more event segments.

According to exemplary embodiments, the computer program code further comprises second generating code configured to cause the at least one processor to generate one or more new event segments, first spitting code configured to cause the at least one processor to split the one or more event segments in the first event processing buffer and the second event processing buffer based on event duration of the one or more new event segments, and first overwriting code configured to cause the at least one processor to overwrite the one or more event segments in the first event processing buffer and the second event processing buffer based on the event duration of the one or more new event segments.

According to exemplary embodiments, the first overwriting code further comprises second determining code configured to cause the at least one processor to determine that the one or more event segments in the first event processing buffer are not associated with a same media segment, first deleting code configured to cause the at least one processor to delete the one or more event segments from the second event processing buffer, second deleting code configured to cause the at least one processor to delete the one or more event segments from the first event processing buffer, and third appending code configured to cause the at least one processor to append the one or more new event segments to the first event buffer and the second event processing buffer.

According to exemplary embodiments, the each of the one or more event segments is associated with at least one media sample in a media buffer.

BRIEF DESCRIPTION OF THE DRAWINGS

[1] Further features, nature, and various advantages of the disclosed subject matter will be more apparent from the following detailed description and the accompanying drawings in which:

FIG. 7 is a simplified diagram of media buffer and event buffers in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

Figure 1:
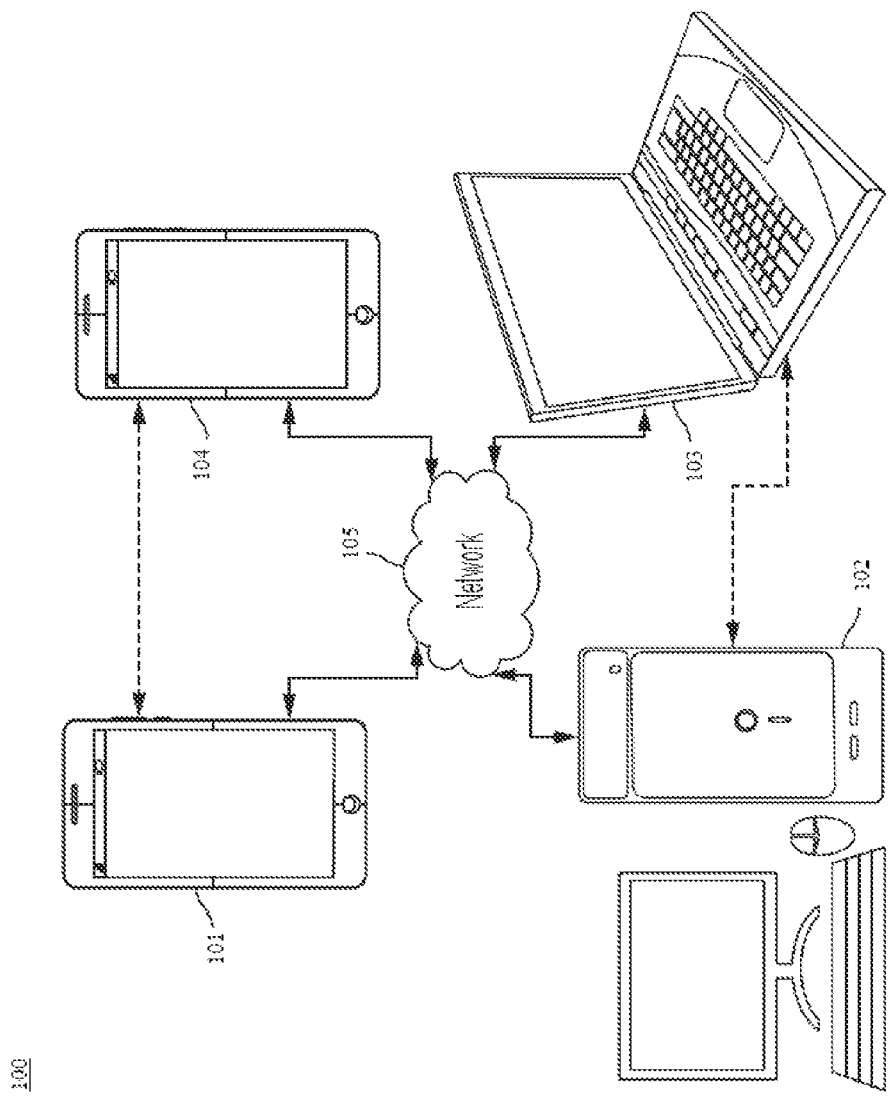
FIG. 1 is a simplified illustration of a communication system in accordance with embodiments.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and/or 104 may code video data captured at a local location for transmission to the other terminal via the network 105. Each terminal 101 and/or 104 also may receive the coded video data transmitted by the other terminal, may decode the coded data and may display the recovered video data at a local display device.

In FIG. 1, the terminals 101, 102, 103 and/or 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and/or 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
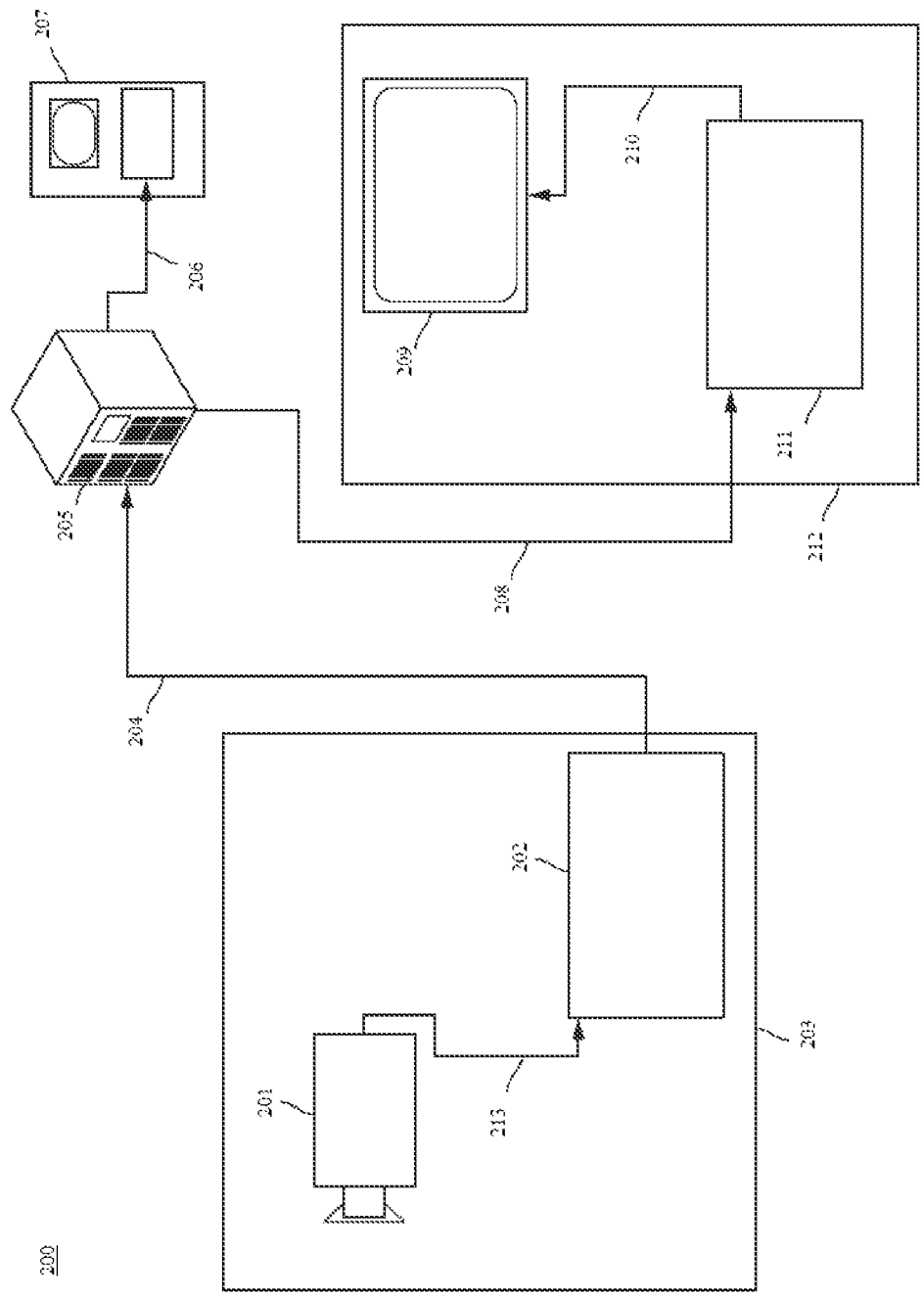
FIG. 2 is an example illustration of placements of components in a streaming environment in accordance with embodiments.

FIG. 2 illustrates, as an example, the placement of a video encoder and decoder in a streaming environment. Embodiments may be applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the video source 201. The encoder 202 can include hardware, software, or a combination thereof to enable or implement aspects of embodiments as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve encoded video bitstream 208 and 206 which may be copies of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the encoded video bitstreams 204, 206 and 208 can be encoded according to certain video coding standards and/or video compression standards. Examples of those standards are noted above and described further herein.

A 5G media streaming (5GMS) system may be an assembly of application functions, application servers, and interfaces from the 5G media streaming architecture that support either downlink media streaming services or uplink media streaming services, or both. A 5GMS Application Provider may include a party that interacts with functions of the 5GMS system and supplies a 5GMS Aware Application that interacts with functions of the 5GMS system. The 5GMS Aware Application may refer to an application in the user equipment (UE), provided by the 5GMS Application Provider, that contains the service logic of the 5GMS application service, and interacts with other 5GMS Client and Network functions via the interfaces and application programming interfaces (APIs) defined in the 5GMS architecture. A 5GMS Client may refer to a UE function that is either a 5GMS downlink (5GMSd) Client or a 5GMS uplink (5GMSu) Client, or both.

The 5GMSd Client may refer to a UE function that includes at least a 5G media streaming player and a media session handler for downlink streaming and that may be accessed through well-defined interfaces/APIs. The 5GMSu Client may refer to an originator of a 5GMSu service that may be accessed through well-defined interfaces/APIs. A 5GMSu media streamer may refer to a UE function that enables uplink delivery of streaming media content to an Application Server (AS) function of the 5GMS Application Provider, and which interacts with both the 5GMSu Aware Application for media capture and subsequent streaming, and the Media Session Handler for media session control.

A dynamic policy may refer to a dynamic policy and charging control (PCC) rule for an uplink or downlink application flow during a media session. An egest session may refer to an uplink media streaming session from the 5GMS AS towards the 5GMSu Application Provider. An ingest session may refer to a session to upload the media content to a 5GMSd AS. A policy template may refer to a collection of (semi-static) Policy or Control Function (PCF)/Network Exposure Function (NEF) API parameters which are specific to the 5GMS Application Provider and also the resulting PCC rule. A policy template ID may identify the desired policy template, which is used by the 5GMSd Application Function (AF) to select the appropriate PCF/NEF API towards the 5G system so that the PCF can compile the desired PCC rule. The Media Player Entry may refer to a document or a pointer to a document that defines a media presentation (e.g., a media presentation description (MPD) for DASH or a uniform resource locator (URL) to a video clip file). A Media Streamer Entry may refer to a pointer (e.g., in the form of a URL) that defines an entry point of an uplink media streaming session. A presentation entry may refer to a document or a pointer to a document that defines an application presentation, such as an HTML5 document.

A Provisioning Session may refer to a data structure supplied at an interface (M1d) by a 5GMSd Application provider that configures the 5GMSd features relevant to a set of 5GMSd Aware Applications. A 5GMSd Media Player may refer to a DE function that enables playback and rendering of a media presentation based on a media play entry and exposing some basic controls such as play, pause, seek, stop, to the 5GMSd Aware Application. Server Access Information may refer to a set of parameters and addresses (including 5GMSd AF and 5GMSd AS addresses) which are needed to activate the reception of a streaming session. A Service and Content Discovery may refer to functionality and procedures provided by a 5GMSd Application Provider to a 5GMS Aware Application that enables the end user to discover the available streaming service and content offerings and select a specific service or content item for access. A Service Announcement may refer to procedures conducted between the 5GMS Aware Application and the 5GMS Application Provider such that the 5GMS Aware Application is able to obtain 5GMS Service Access Information, either directly or in the form of a reference to that information.

A third party player may refer to a part of an application that uses APIs to exercise selected 5GMSd functions to play back media content. A third party uplink streamer may refer to a part of an application that uses APIs to exercise selected 5GMSu functions to capture and stream media content.

Figure 3:
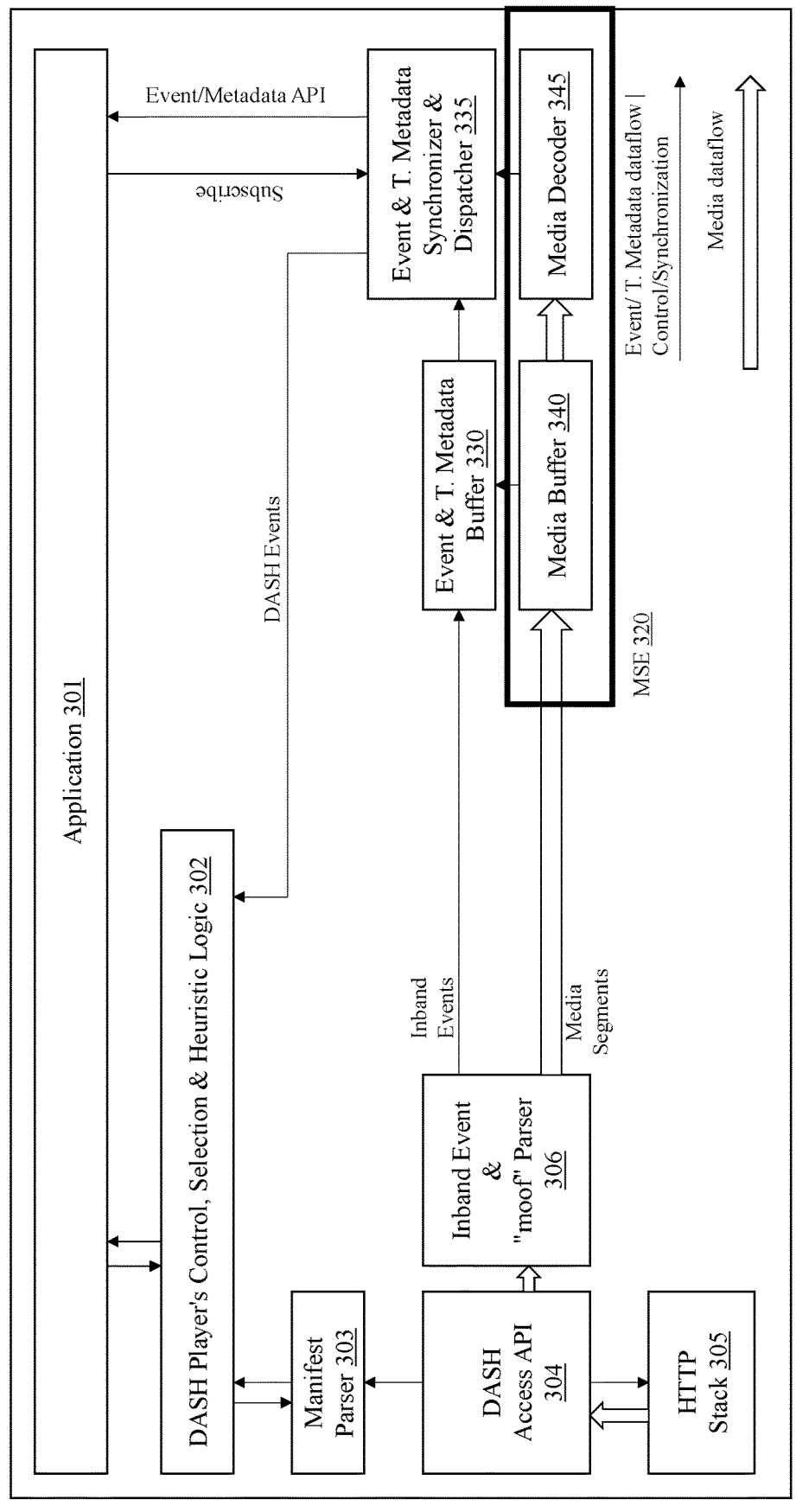
FIG. 3 is a simplified block diagram of a DASH processing model in accordance with embodiments.

FIG. 3 shows a sample DASH processing model 300, such as of a sample client architecture for processing DASH and CMAF events. In the DASH processing model 300, a client's request of media segments may be based on described addresses in a manifest 303. The manifest 303 also describes metadata tracks from which a client may access segments of metadata tracks, parse them, and send them to an application 301.

The manifest 303 includes MPD events or inband events, and an inband event and 'moof' parser 306 may parse MPD event segments or inband event segments and append the event segments to an event and metadata buffer 330. The inband event and 'moof' parser 306 may also fetch and append the media segments to a media buffer 340. The event and metadata buffer 330 may send event and metadata information to an event and metadata synchronizer and dispatcher 335. The event and metadata synchronizer and dispatcher 335 may dispatch specific events to DASH players control, selection, and heuristic logic 302 and application related events and metadata tracks to application 301.

According to some embodiments, a MSE may include the media buffer 340 and a media decoder 345. MSE 320 is a logical buffer(s) of media segments, where the media segments may be tracked and ordered based on the media segments' presentation time. Each media segment may be added or appended to the media buffer 340 based on the media segments' timestamp offset, and the timestamp offset may be used to order the media segments in the media buffer 340.

As long as media segments exist in the media buffer 340, the event and metadata buffer 330 maintains corresponding event segments and metadata. According to FIG. 3, the MSE 320 includes only the media buffer 340 and the media decoder 345. The event and metadata buffer 330 and event and metadata synchronizer and dispatcher 335 are not native to the MSE 320, inhibiting the MSE 320 from natively processing events and sending them to the application.

Figure 4:
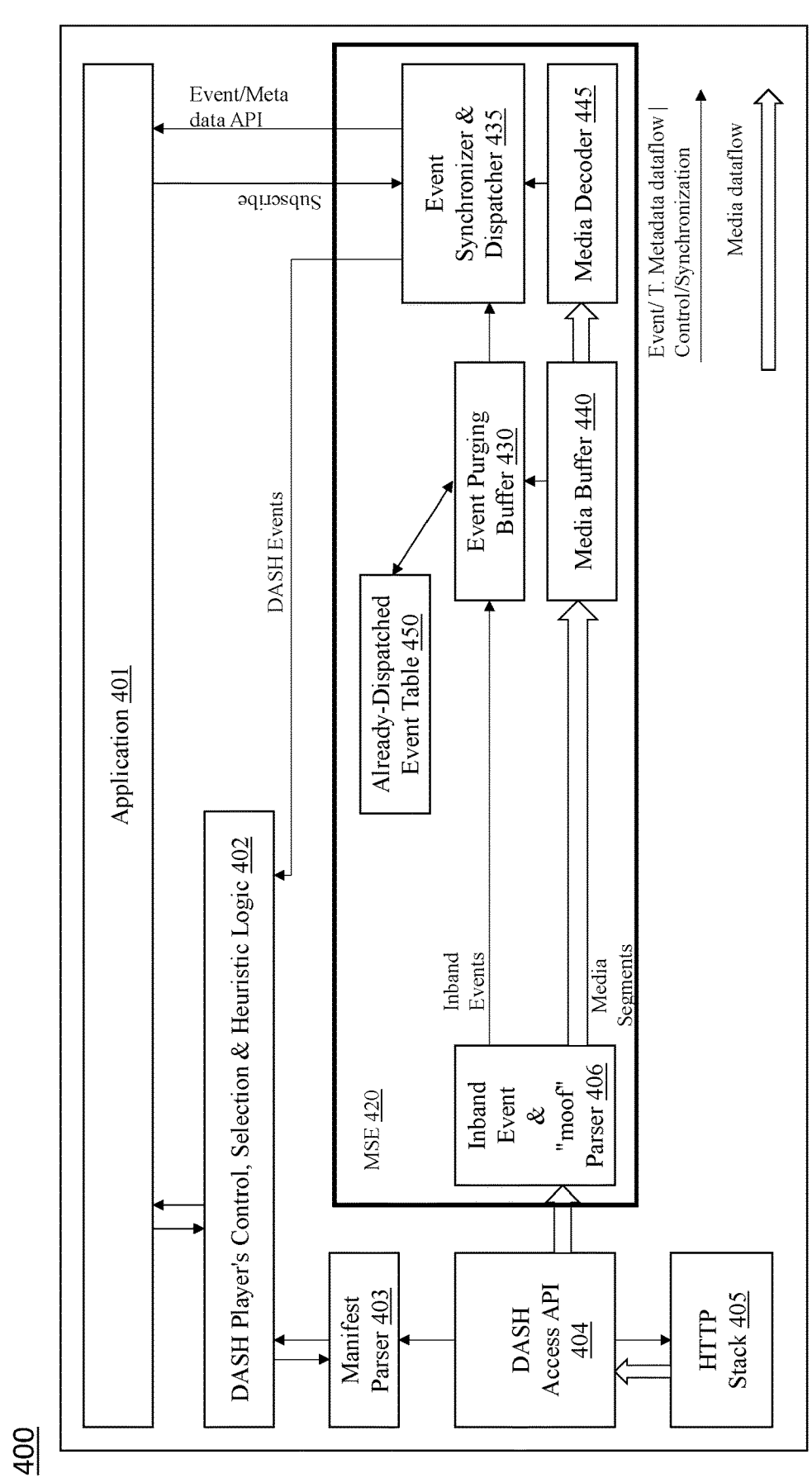
FIG. 4 is a simplified block diagram of a DASH processing model in accordance with embodiments.

FIG. 4 shows a sample DASH processing model 400, such as of a such as of a sample client architecture for processing DASH and CMAF events. In the DASH processing model 400, a client request of media segments may be based on described addresses in a manifest 403. The manifest 403 also describes metadata tracks from which a client may access segments of metadata tracks, parse them, and send them to an application 401.

The manifest 403 includes MPD events or inband events, and an inband event and 'moof' parser 406 may parse the MPD event segments or inband event segments and append the event segments to an event purging buffer 430. Based on the media data or media stream and information in the manifest 403, the inband event and 'moof' parser 406 may fetch and append the media segments to a media buffer 440. The event purging buffer 330 may send event and metadata information to an event synchronizer and dispatcher 435. The event synchronizer and dispatcher 435 may dispatch specific events to DASH players control, selection, and heuristic logic 402 and application related events and metadata tracks to application 401.

According to exemplary embodiments, in FIG. 4, the MSE is extended to include the media buffer 340, media decoder 345, event purging buffer 430, event synchronizer and dispatcher 435, and an already-dispatched event table 450. The already-dispatched event table 450 may record the events that are already dispatched to the application 401. The extension of event purging buffer 430 and event synchronizer and dispatcher 435, enables the MSE to process inband events natively and the creation of already-dispatched event table 450 enables recording and tracking of already dispatched event messages.

In exemplary embodiments, the MSE 420 or its components may dispatch events based on an event segment's event specific offset. An example includes event start time offset. The MSE 420 or its components may determine event start time offset for an event segment, wherein the start time offset is determined with reference to event presentation time, and use the event start time offset to order and dispatch events in the event purging buffer 430 or event synchronizer and dispatcher 435. In exemplary embodiments, the event start time offset and timestamp offset may be equivalent, with the event start time offset referring to event segments in the event purging buffer 430 or the event synchronizer and dispatcher 435 and the time stamp offset referring to media segments in the media buffer 440.

In exemplary embodiments, the MSE 420 may handle event segment and media segment purging and overwriting for associated events and media. The MSE 420 may retain an event in the event purging buffer 430 or the event synchronizer and dispatcher 435 if the media segment associated with the event is retained in the media buffer 440. The MSE 420 may manage timing and duration of the event segments based on the timing and duration of the associated media segments.

In exemplary embodiments, the application 401 may set the timestamp offset or the event time stamp offset. The application 401 may also set the scheme URI/value and the dispatch mode for the scheme URI/value. The MSE 420 may dispatch events based on scheme URI/value, the event ID, the event association ID that indicates the media segment associated with the event segment, the event segment's presentation time, the event's start time offset, and event duration.

Figure 5:
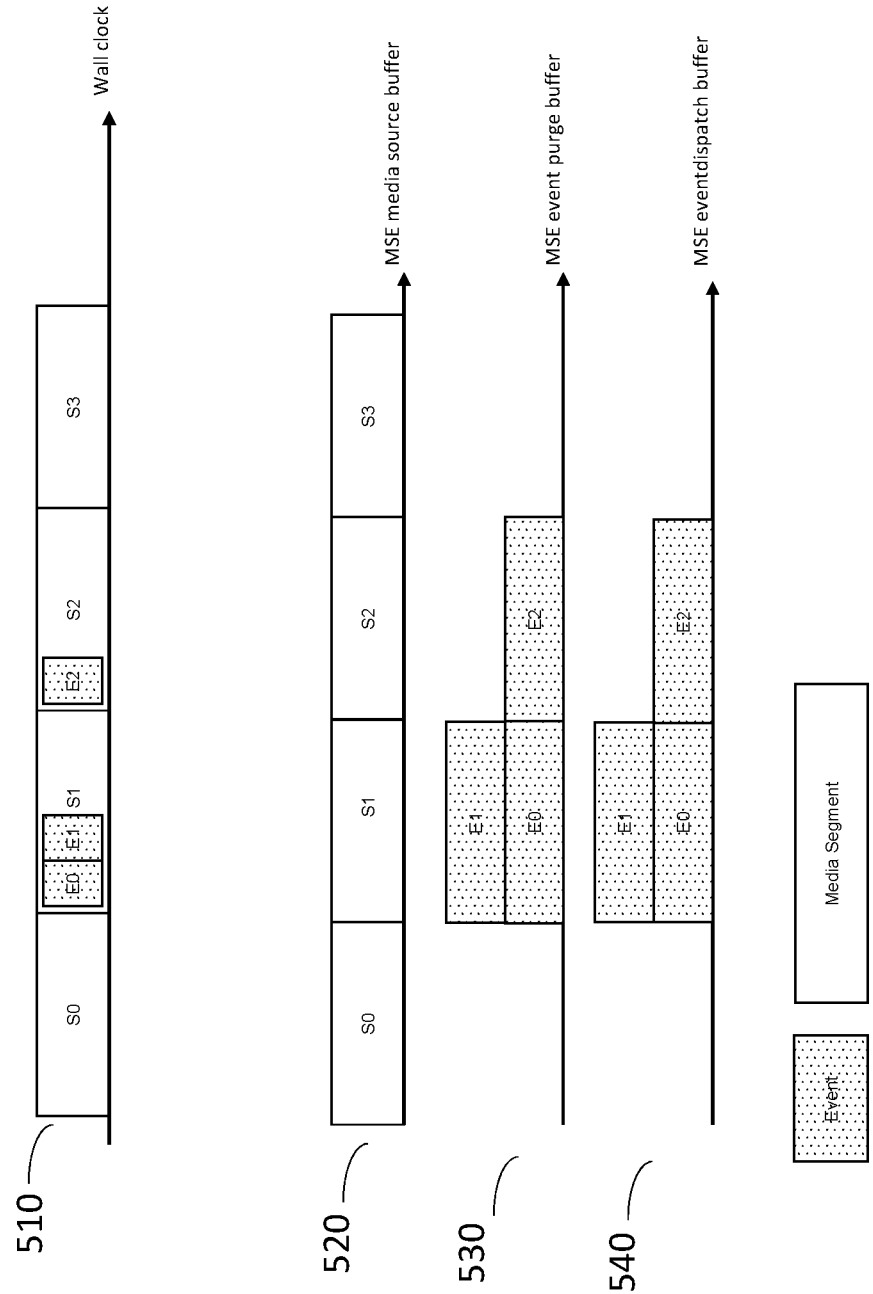
FIG. 5 is a simplified diagram of media buffer and event buffers in accordance with embodiments.

FIG. 5 shows an example media and event buffer set 500 processing media segments and event segments. Each media stream 510 may comprise of media segments (S0, S1, S2, S3) and event segments (E0, E1, E2). The media segments may be appended to a media source buffer or media buffer 520.

An inband event and 'moof' parser 406 may parse the media stream and may generate media segments and event segments. Each media segment may be appended to the media source buffer or media buffer 520 based on a timestamp offset. Each media segment appended to the media source buffer or media buffer 520 may have a unique event association ID. The generated event segments (E0, E1, E2) may be associated with a specific media segment (S0, S1, S2, S3) using the respective media segment's event association ID. In exemplary embodiments, multiple event segments may be associated with a media segment.

In exemplary embodiments, event segments (E0, E1, E2) may be appended to the event purge buffer 530 by aligning the event segments' event start time and event duration in the event purge buffer 530 with the start time and duration of the associated media segment (S0, S1, S2, S3) in the media buffer 520. As an example, one or more event segments' presentation time or event start time offset and duration in the event purge buffer 530 may be aligned with the presentation time and duration of the associated media segment in the media buffer 620. In some exemplary embodiments, if more than one event segment is associated with a same media segment, then each event segment's event start time offset may be adjusted based on the associated media segment's presentation time.

In some exemplary embodiments, event segments may be appended to the event dispatch buffer 540 by duplicating the respective event segments' event start times and durations in the event purge buffer 530. In some embodiments, order, presentation time, and duration of event segments may be equivalent in both the event purge buffer 530 and the event dispatch buffer 540. As an example, if the application has set the scheme as "on receive" event segments' presentation time or event start time offset and duration in the event dispatch buffer 540 may be aligned with the presentation time and duration of the associated media segment i.e., the event dispatch buffer 540 may be a duplication of the event purge buffer 530.

Figure 6:
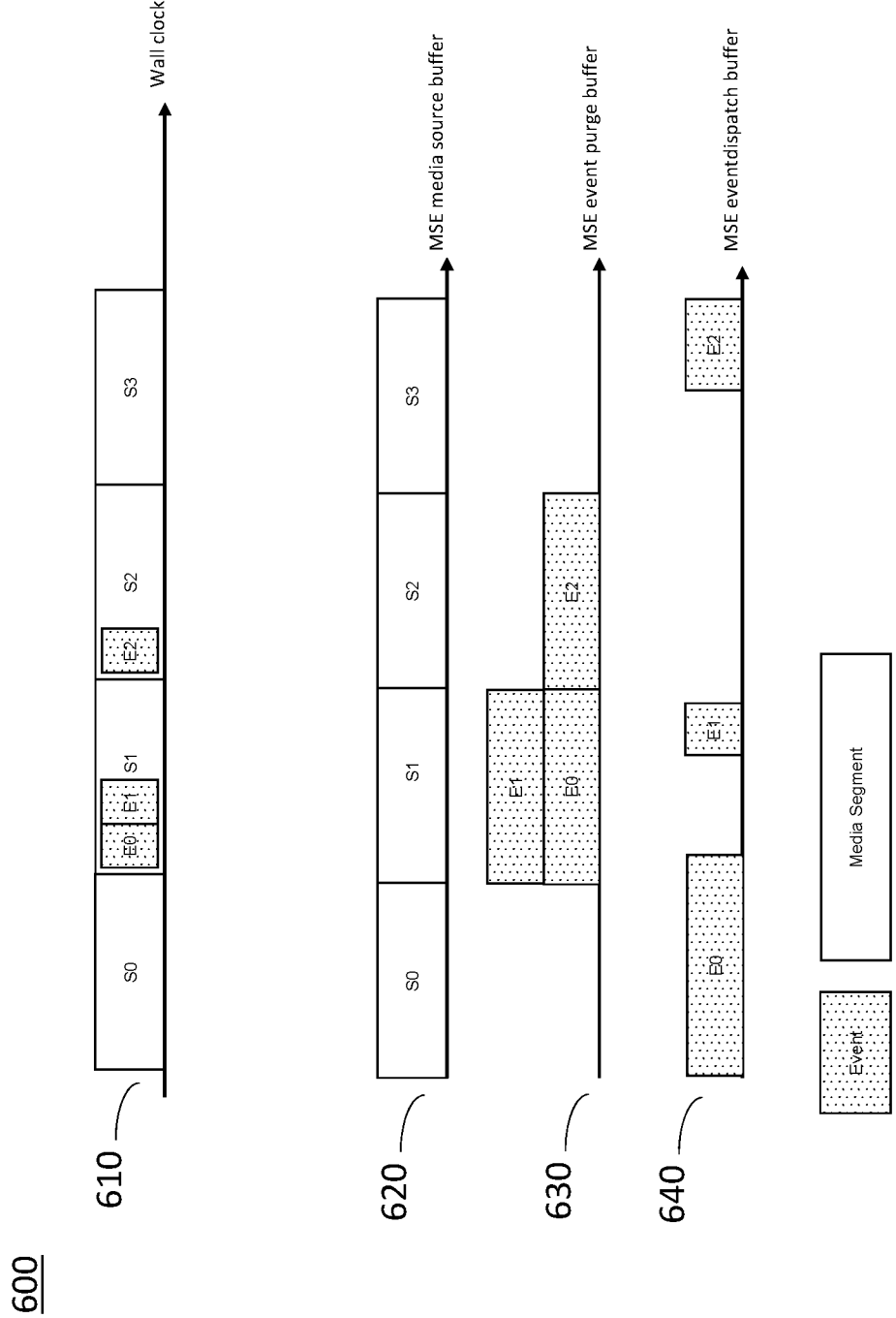
FIG. 6 is a simplified diagram of media buffer and event buffers in accordance with embodiments.

FIG. 6 shows an example media and event buffer set processing media segments and event segments. Each media stream 610 may comprise of media segments (S0, S1, S2, S3) and event segments (E0, E1, E2). The media segments may be appended to a media source buffer or media buffer 620.

An inband event and 'moof' parser 406 may parse the media stream and may generate media segments and event segments. Each media segment may be appended to the media source buffer or media buffer 620 based on a timestamp offset. Each media segment appended to the media source buffer or media buffer 620 may have a unique event association ID. The generated event segments (E0, E1, E2) may be associated with a specific media segment (S0, S1, S2, S3) using the respective media segment's event association ID. In exemplary embodiments, multiple event segments may be associated with a media segment.

In exemplary embodiments, event segments (E0, E1, E2) may be appended to the event purge buffer 630 by aligning the event segments' event start time and event duration in the event purge buffer 630 with the start time and duration of the associated media segment (S0, S1, S2, S3) in the media buffer 620. As an example, one or more event segments' presentation time or event start time offset and duration in the event purge buffer 630 may be aligned with the presentation time and duration of the associated media segment in the media buffer 620. In some exemplary embodiments, if more than one event segment is associated with the same media segment, then each event segment's event start time offset should be adjusted based on the associated media segment's presentation time.

In exemplary embodiments, event segments may be appended to the event dispatch buffer 640 by adding event segments such that the event segments' event start time offset is the event's presentation time in the event dispatch buffer 640 and the event segment's duration is the event's duration in the event dispatch buffer 640. As an example, if the application has set the scheme as "on_start" event segments' presentation time and duration in the event dispatch buffer 640 may reflect the event segments' event start time offset and duration. In some embodiments, the event dispatch buffer 640 may reflect the event segment's event start time and duration, i.e., the event segment may be appended such that the event segment is in the event dispatch buffer 640 from the event segment's start until the event segment's end. Thus, in some embodiments, the event purge buffer 630 and the event dispatch buffer 640 may not be equivalent.

FIG. 7 shows in example media and event buffer set 700 for processing media segments and event segments. Each media stream 710 may comprise of media segments (S0, S1, S2, S3) and event segments (E0, E1, E2). The media segments may be appended to a media source buffer or media buffer 720.

In exemplary embodiments, event segments (E0, E1, E2) in an event purge buffer 730 and an event dispatch buffer 740 may be removed, purged, or overwritten. In some embodiments, event segments may be partially removed, purged, or overwritten. To remove, purge, or overwrite event segments, the event segments may be removed from the event purge buffer 730 and the event dispatch buffer 740. As an example, once a media segment is overwritten in the media buffer 720, the corresponding event segments in the event purge buffer 730 and event dispatch buffer 740 that associated with the overwritten media segments may be overwritten as well.

In some embodiments, to remove or overwrite event segments partially, event segments may be split into smaller sections in the event purge buffer 730 and the event dispatch buffer 740, and only the sections of the event segments that overlap with new event segments may be removed, purged, or overwritten and the new event segment sections added instead. As an example, if new event segments are smaller than the current event segments in the event purge buffer 730 or the event dispatch buffer 740, the current event segment(s) in the event purge buffer 730 may be split into smaller sections to match the new event segments. The sections of the event segments in the event purge buffer 730 that overlap with the new smaller event segments may be removed, purged, or overwritten.

In some embodiments, only the event segments in the event purge buffer 730 that overlap the new event segments may be removed, purged, or overwritten. In some embodiments only the event segments in the event dispatch buffer 740 that overlap the new event segments may be removed, purged, or overwritten. The event purge buffer 730 may be overwritten and then the event dispatch buffer 740 may be overwritten such that the event purge buffer 730 and the event dispatch buffer 740 may be equivalent. As an example, if the application has set the scheme as "on receive" the event segments or event segment sections that overlap with the new event segments in both the event purge buffer 730 and the event dispatch buffer 740 may be overwritten.

In some exemplary embodiments, removal, purge, or overwriting of event segments may require determining that there is no other event segment in the event purge buffer 730 that is associated with the same media segment. In some exemplary embodiments, if there is no other event segment in the event purge buffer 730 associated with the same media segment, then the corresponding event in the event dispatch buffer 740 may be removed, purged, or overwritten. As an example, if more than one event segment overlaps the new event segment in the event purge buffer 730, overwriting the overlapping event segment may require that all the event segments associated with the same media segment are dispatched before overwriting the overlapping event segment in the event purge buffer 730. In some embodiments, if there are no event segments associated with the same media segment in the event purge buffer 730, the overlapping event segment may be overwritten in the event purge buffer 730. As an example, if the application has set the scheme to "on_start" overwriting an overlapping event segment in the event purge buffer 730 may require that all the event segments associated with the same media segment are dispatched before overwriting the overlapping event segment in the event purge buffer 730. In some embodiments, once the event segment is removed, purged, or overwritten in the event purge buffer 730, the corresponding event segment may be removed, purged, or overwritten in the event dispatch buffer 740. As an example, if the application has set the scheme to "on_start" the overlapping segment to be overwritten in the event dispatch buffer 740 may be overwritten after the overlapping event segment(s) in the event purge buffer 730 are overwritten.

Figure 8A:
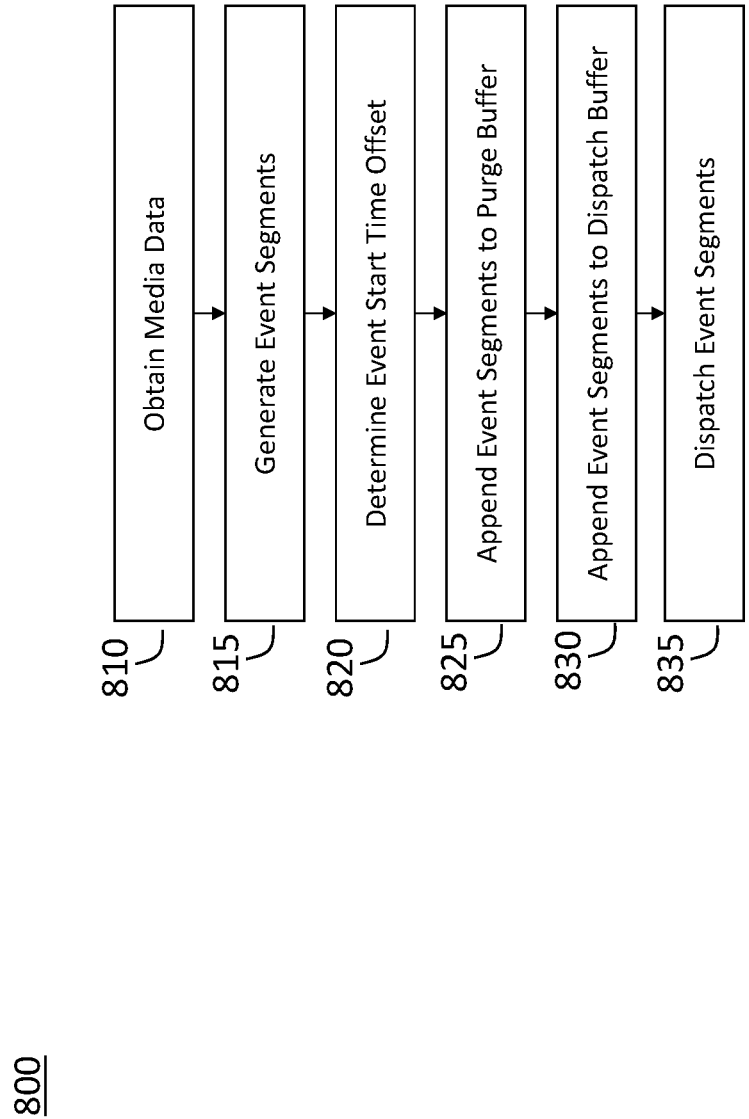
FIG. 8A is a simplified flowchart illustrating a process for processing DASH and CMAF inband events in accordance with embodiments.

FIG. 8A shows an exemplary flowchart illustrating a process 800 with respect to processing DASH and CMAF inband events wherein according to exemplary embodiments event segments may be appended to an event purge buffer and an event dispatch buffer. At 810, media data is obtained. The media data may be any type of media data. As an example, the media data may be audio data, video data, document, or any combination of thereof. The obtained media data may also contain event data.

At 815, event segments may be generated from the obtained media data. In some embodiments, an MSE or a parser component of the MSE may generate event segments from the obtained media data. Event segments may include MPDs and inband events to deliver media timeline related events to a client or an application. As an example, the inband event and 'moof' parser (306 or 406) may generate event segments from the obtained media data. In some embodiments, the parser may generate both media segments and event segments corresponding to the media segments. As an example, the inband event and 'moof' parser (306 or 406) may generate media segments and associated event segments from the media data. The event segments may be associated with event segments using an event association ID, wherein the event association ID may be a unique ID associated with a media segment. In some embodiments, multiple event segments may be associated with the same media segment. Event segments associated with the same media segment may have the event association ID.

At 820, the event start time offset of an event segment is determined. In some embodiments, the MSE or its components may determine the event start time offset for each event segment to be appended to the event purge buffer or the event dispatch buffer. In some embodiments, the event start time offset for an event segment may be based on the time at which the event segment is appended to the event purging buffer. In some embodiments, the event start time offset for an event segment may be based on the time at which the event segment is appended to the event dispatch buffer. In some embodiments, an event segment's event start time offset may be based on the event segment's or media segment's presentation time in the MSE API. The event segment's start time offset indicates the start time of the event from the moment of dispatch. Thus, when an event segment is sent to an application, the application can determine the relative start of the event from the moment of dispatch instead of comparing common time reference. Using an event segment's event start time offset based on the time in the MSE API eliminates the need for an application to compare common time reference when determining relative start times for event segments, increasing application processing efficiency and reducing bandwidth requirements.

At 825, event segments may be appended to an event purge buffer based on the event segment's event start time offset. The event purge buffer may be used to track event segments' order, their location, and dispatch timing. In some embodiments, appending an event segment to the purging buffer may include aligning the presentation time and duration of the event segment with the respective presentation time and duration of the associated media segment. As an example, event segments associated with a media segment may be placed in the event purge buffer such that the event segments have the same presentation time and duration as that of the media segments associated with each event segment.

At 830, the event segments may be appended to the an event dispatch buffer based on the event segment's dispatch information. In some embodiments dispatch information may include information indicating at least one of event initialization, event appending, event purging, event duration, event overwrite, or attributes set by an application. Some attributes set by the application or based on attributes set by the application may include scheme URI/value, id, event segment's event start time offset, event segment's start presentation delta and event segment duration.

In some embodiments, appending the event segment to the event dispatch buffer may include replicating or duplicating the appending of the event segment to the event purge buffer. Thus, the order, presentation time, and duration of event segments may be the same in the event purge buffer and the event dispatch buffer. As an example, if the application has set the scheme as "on receive" one or more event segments' presentation time or event start time offset and duration in the event dispatch buffer may be aligned with the presentation time and duration of the associated media segment i.e., the event dispatch buffer may be a duplication of the event purge buffer.

In some embodiments, appending the event segment to the event dispatch buffer may be achieved by adding event segments in a way that the event segment's event start time offset is the event's presentation time in the event dispatch buffer and the event segment's duration is the event's duration in the event dispatch buffer. As an example, if the application has set the scheme as "on_start" the event segment's presentation time and duration in the event dispatch buffer may reflect the event segment's event start time offset and duration. In some embodiments, the event dispatch buffer may reflect the event segment's event start time and duration, i.e., the event segment may be appended such that the event segment is in the buffer from the event segment's start until the event segment's end. Thus, in some embodiments, the event purge buffer and the event dispatch buffer may not be equivalent.

At 835, event segments may be dispatched to the application based on dispatch information for respective event segments. Dispatch information may include information about event segment initialization, event association ID, event start time offset, event segment duration, the application scheme URI/value, and event purging, event appending, event overwrite attributes.

Figure 8B:
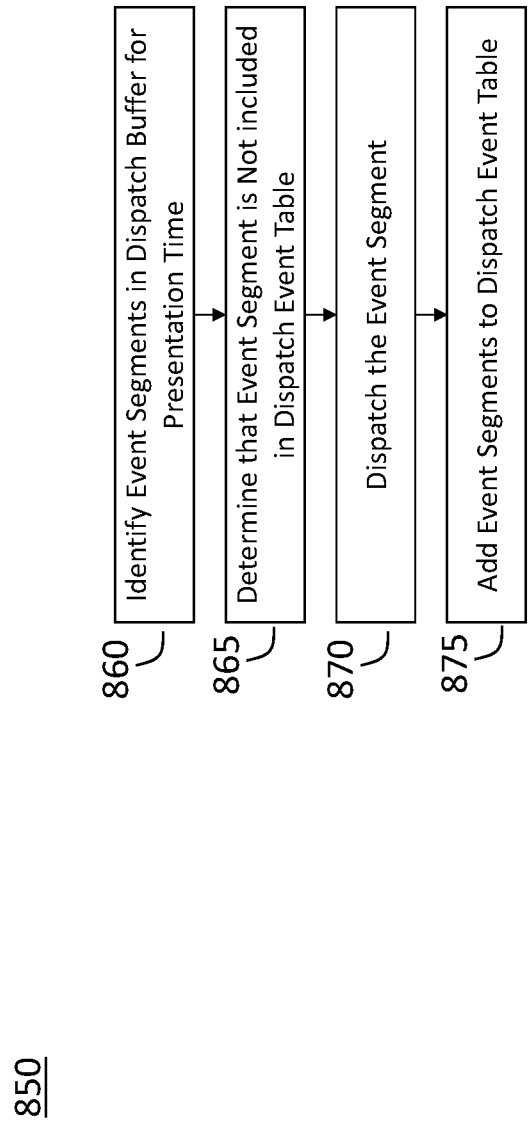
FIG. 8B is a simplified flowchart illustrating a process for processing DASH and CMAF inband events in accordance with embodiments.

FIG. 8B shows an exemplary flowchart illustrating a process 850 with respect to processing DASH and CMAF inband events wherein according to exemplary embodiments event segments may be dispatched from an event purge buffer and an event dispatch buffer.

At 860, event segments in the event dispatch buffer for the specific presentation time are identified. In some embodiments, an MSE or its components may identify the event segments in the event dispatch buffer for the specific presentation time. In some embodiments, the presentation time may be based on the MSE API event presentation time. In other embodiments, the presentation time may be based on the presentation time for media segments. Multiple event segments may be associated with an event association ID, i.e., multiple event segments may be associated with a same media segment.

At 865, whether an event segment identified in the event dispatch buffer for the specific presentation time is included in a dispatch event table is determined. In some embodiments, the MSE or its components may determine whether an event segment is included in an dispatch event table. The dispatch event table may keep a record of event segments or event messages that have already been dispatched to an application. Thus, if an event segment is included in the dispatch event table, then that event segment may already be dispatched to an application. If an event segment in the event dispatch buffer at the presentation time is not included in the dispatch event table, the event segment may dispatched to the application at 870 because that event segment is likely not dispatched to the application yet. As an example, if an event ID of an event segment in the event dispatch buffer at the presentation time is not present in the dispatch event table, then the event segment is dispatched to an application. As another example, if the event ID of an event segment in the event dispatch buffer at the presentation time is included in the dispatch event table, then that event segment may already be dispatched to the application.

At 875, event segments that are dispatched to an application may be added to the dispatch event table. In some embodiments, event segments that are dispatched and not included in the dispatch event table are added to the dispatch event table. As an example, if an event segment was dispatched to an application then the event ID of that event segment may be added to the dispatch event table to maintain a records that that event segment was dispatched to the application.

Figure 9:
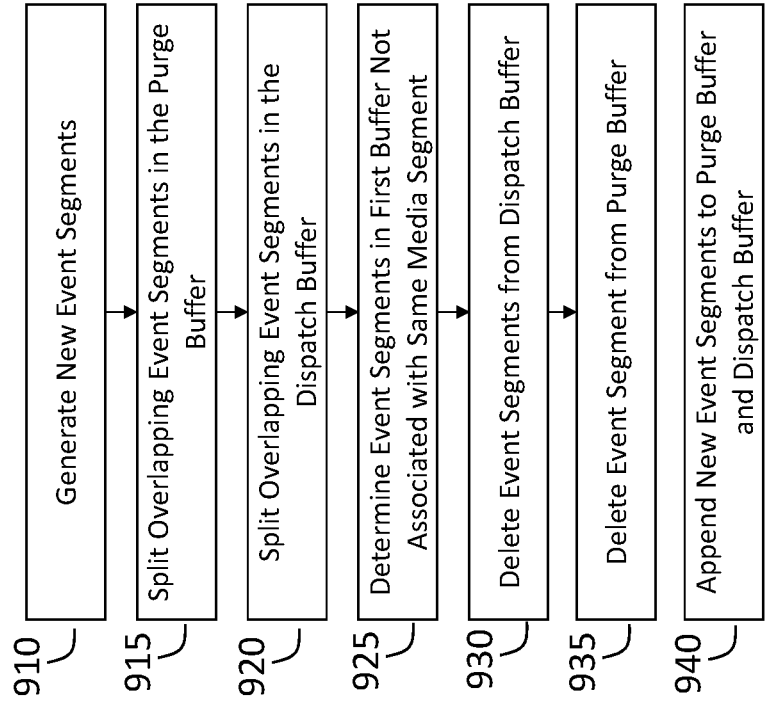
FIG. 9 is a simplified flowchart illustrating a process for processing DASH and CMAF inband events in accordance with embodiments.

FIG. 9 shows an exemplary flowchart illustrating a process 900 with respect to processing DASH and CMAF inband events wherein according to exemplary embodiments event segments may be removed, purged, or overwritten from an event purge buffer and an event dispatch buffer. At 910, new event segments from new media data are generated. In some embodiments, an MSE or its components may generate one or more new event segments from new media data. In some exemplary embodiments, new event segments may be generated for new media segments being appended to the media buffer. As an example, when new media segments are parsed and appended to the media buffer, new event segments corresponding to the new media segments may be appended to the event purge buffer and event dispatch buffer.

At 915, event segments overlapping with new event segments in the event purge buffer may be spilt to match the event duration, event start time offset, or presentation time of the new event segments. If the new segments are smaller than the event segments in the event purge buffer, the overlapping event segments in the event purge buffer may be split to match the event duration of the new event segments. As an example, if the new event segments that overlap with event segments in the event purge buffer have shorter event duration, the overlapping event segments in the event purge buffer may be split into two or more sections corresponding to the shorter event duration of the new event segments. In some embodiments, the event segment sections in the event purge buffer that overlap are removed, purged, or overwritten based on the duration of the new event segments.

At 920, event segments overlapping with new event segments in the event dispatch buffer may be spilt to match the event duration, event start time offset, or presentation time of the new event segments. If the new segments are smaller or shorter than the event segments in the event dispatch buffer, the overlapping event segments in the event dispatch buffer may be split to match the event duration, event start time offset, or presentation time of the new event segments. As an example, if the new event segments that overlap with event segments in the event dispatch buffer have shorter event duration, the overlapping event segments in the event dispatch buffer may be split into two or more sections corresponding to the shorter event duration of the new event segments. In some embodiments, the event segment sections in the event dispatch buffer that overlap are removed, purged, or overwritten based on the duration of the new event segments.

At 925, whether event segments from the event purge buffer and the event dispatch buffer may be removed, purged, or overwritten is determined. Whether event segments from the event purge buffer or the event dispatch buffer may be removed, purged, or overwritten depends on whether all event segments associated with a media segment being overwritten are dispatched. If event segments from the event purge buffer that overlap with the new event segments are not associated with the same media segment, at 930, the event segments from the event purge buffer that overlap with the new event segments may be deleted from the event dispatch buffer. At 935, event segments from the event purge buffer that overlap with the new event segments may be deleted from the event purge buffer. As an example, if the application has set the scheme as "on_start" and if event segments from the event purge buffer that overlap with the new event segments are not associated with the same media segment, then the event segments that overlap with the new event segments may be deleted from the event purge buffer and may also be deleted from the event dispatch buffer because there are other events associated with the same media segment have likely been dispatched already.

In some embodiments, the step of determining whether overlapping event segments in the event purge buffer are not associated with the same media segment may be optionally performed. As an example, if an application has set the scheme to "on receive" then the step of determining whether overlapping event segments in the event purge buffer are not associated with the same media segment may not be performed.

At 930, the event segments that overlap with the new event segments may be deleted from the event purge buffer. At 935, the event segments that overlap with the new event segments may be deleted from the event dispatch buffer. At 940, the new event segments may be appended to the event purge buffer and the event dispatch buffer in accordance with the embodiments in the present disclosure.

Although FIGS. 8A-8B and 9 shows example blocks of the processes 800, 850, and 900, in embodiments, the processes 800, 850, and 900 may include additional blocks, fewer blocks, different blocks, or differently arranged blocks than those depicted in FIGS. 8A-8B and 9. In embodiments, any blocks of processes 800, 850, and 900 may be combined or arranged in any amount or order, as desired. In embodiments, two or more of the blocks of the processes 800, 850, and 900 may be performed in parallel.

The techniques described above, can be implemented as computer software using computer-readable instructions and physically stored in one or more computer-readable media or by a specifically configured one or more hardware processors. For example, FIG. 10 shows a computer system 1000 suitable for implementing various embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
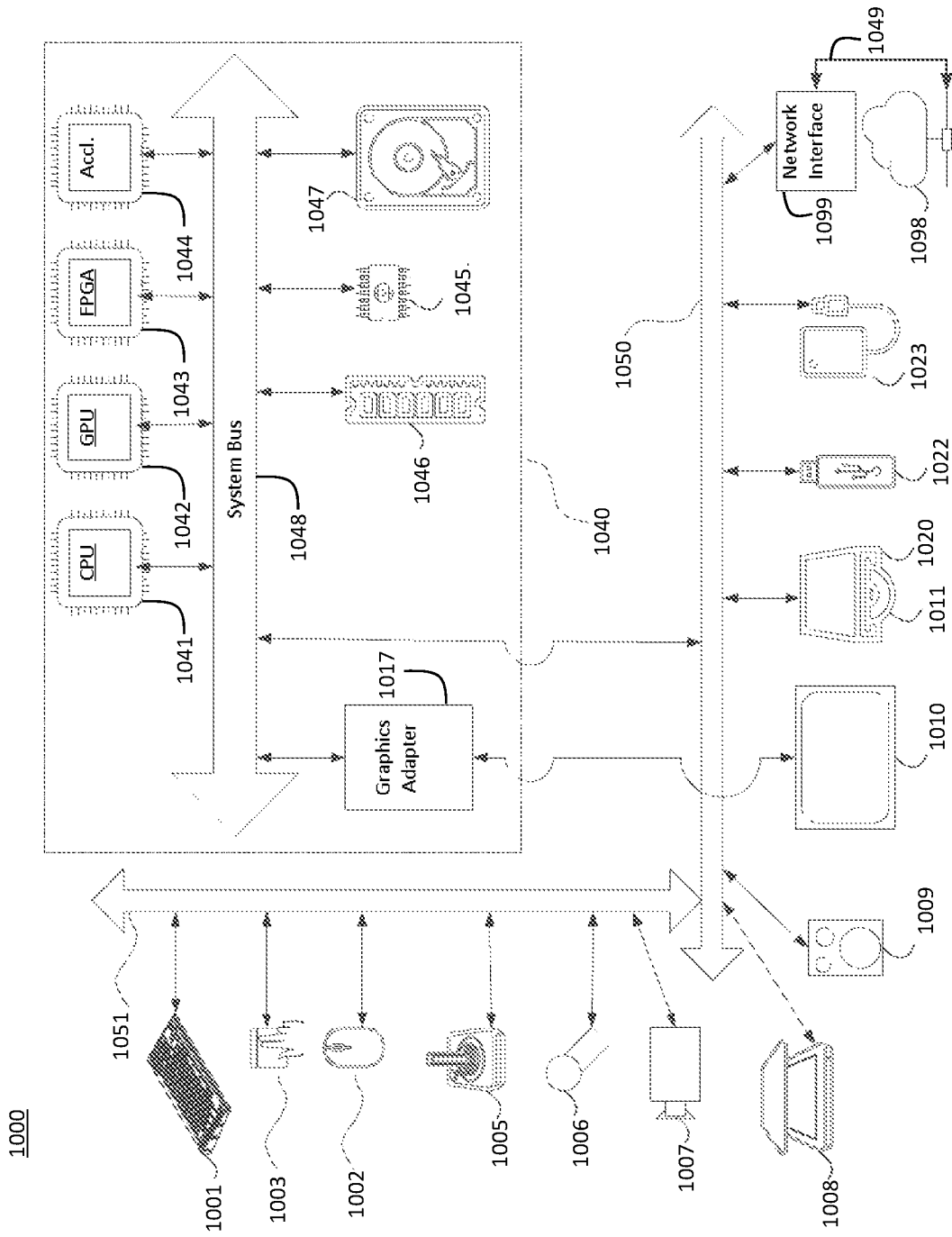
FIG. 10 is a simplified diagram of a computer system in accordance with embodiments.

The components shown in FIG. 10 for computer system 1000 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, joystick 1005, microphone 1006, scanner 1008, camera 1007.

Computer system 1000 may also include certain human interface output devices. Such human interface output devices may be stimulating the senses of one or more human users through, for example, tactile output, sound, light, and smell/taste. Such human interface output devices may include tactile output devices (for example tactile feedback by the touch screen 1010, or joystick 1005, but there can also be tactile feedback devices that do not serve as input devices), audio output devices (such as: speakers 1009, headphones), visual output devices (such as screens 1010 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses, holographic displays and smoke tanks), and printers.

Computer system 1000 can also include human accessible storage devices and their associated media such as optical media including CD/DVD ROM/RW 1020 with CD/DVD 1011 or the like media, thumb-drive 1022, removable hard drive or solid state drive 1023, legacy magnetic media such as tape and floppy disc, specialized ROM/ASIC/PLD based devices such as security dongles, and the like.

Those skilled in the art should also understand that term "computer readable media" as used in connection with the presently disclosed subject matter does not encompass transmission media, carrier waves, or other transitory signals.

Computer system 1000 can also include interface 1099 to one or more communication networks 1098. Networks 1098 can for example be wireless, wireline, optical. Networks 1098 can further be local, wide-area, metropolitan, vehicular and industrial, real-time, delay-tolerant, and so on. Examples of networks 1098 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1098 commonly require external network interface adapters that attached to certain general-purpose data ports or peripheral buses (1050 and 1051) (such as, for example USB ports of the computer system 1000; others are commonly integrated into the core of the computer system 1000 by attachment to a system bus as described below (for example Ethernet interface into a PC computer system or cellular network interface into a smartphone computer system). Using any of these networks 1098, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1000.

The core 1040 can include one or more Central Processing Units (CPU) 1041, Graphics Processing Units (GPU) 1042, a graphics adapter 1017, specialized programmable processing units in the form of Field Programmable Gate Areas (FPGA) 1043, hardware accelerators for certain tasks 1044, and so forth. These devices, along with Read-only memory (ROM) 1045, Random-access memory 1046, internal mass storage such as internal non-user accessible hard drives, SSDs, and the like 1047, may be connected through a system bus 1048. In some computer systems, the system bus 1048 can be accessible in the form of one or more physical plugs to enable extensions by additional CPUs, GPU, and the like. The peripheral devices can be attached either directly to the core's system bus 1048, or through a peripheral bus 1051. Architectures for a peripheral bus include PCI, USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also be stored in RAM 1046, whereas permanent data can be stored for example, in the internal mass storage 1047. Fast storage and retrieval to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 1000 having the illustrated architecture, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of processing events in a media stream, the method comprising:
    obtaining a first event processing buffer and a second event processing buffer, wherein the first event processing buffer comprises an event start offset for each of a one or more event segments, and wherein the second event processing buffer comprises event dispatch information for the each of the one or more event segments;
    obtaining one or more new event segments associated with media data;
    splitting the one or more event segments in the first event processing buffer and the second event processing buffer based on an event duration of the one or more new event segments;
    overwriting the one or more event segments in the first event processing buffer and the second event processing buffer based on the event duration of the one or more new event segments; and
    dispatching the one or more event segments and the one or more new event segments based on the first event processing buffer and the event dispatch information in the second event processing buffer.

2. The method according to claim 1, wherein the method further comprises appending of the one or more event segments to the first event processing buffer is based on a time at which the each of the one or more event segments is appended to the first event processing buffer.

3. The method according to claim 1, wherein the event dispatch information comprises information indicating at least one of event initialization, event appending, event purging, event duration, or event overwrite.

4. The method according to claim 1, wherein the method further comprises appending of the one or more event segments to the second event processing buffer, wherein the appending comprises duplicating the appending of the one or more event segments to the first event processing buffer.

5. The method according to claim 4, wherein the appending of the one or more event segments to the second event processing buffer is based on the event dispatch information for the each of the one or more event segments.

6. The method according to claim 1, wherein the dispatching of the one or more event segments and the one or more new event segments comprises:
   determining whether the one or more event segments or the one or more new event segments is included in a dispatch event table; and
   based on determining that the one or more event segments or the one or more new event segments is not included in the dispatch event table, dispatching the one or more event segments or the one or more new event segments to an application.

7. The method according to claim 1, further comprising:
   after the dispatching of the one or more event segments and the one or more new event segments, adding the one or more event segments and the one or more new event segments to a dispatch event table.

8. The method of claim 2, and wherein the appending causes the each of the one or more event segments to align respective presentation time and duration of the each of the one or more event segments with respective presentation time and duration of at least one associated media sample in a media buffer.

9. The method according to claim 1, wherein the overwriting of the one or more event segments comprises:
   determining that the one or more event segments in the first event processing buffer are not associated with a same media segment;
   deleting the one or more event segments from the second event processing buffer;
   deleting the one or more event segments from the first event processing buffer; and
   appending the one or more new event segments to the first event processing buffer and the second event processing buffer.

10. The method according to claim 1, wherein the each of the one or more event segments is associated with at least one media sample in a media buffer.

11. An apparatus for processing events in a media stream, the apparatus comprising:
    at least one memory configured to store computer program code;
    at least one processor configured to access the computer program code and operate as instructed by the computer program code, the computer program code including:
       first obtaining code configured to cause the at least one processor to obtain a first event processing buffer and a second event processing buffer, wherein the first event processing buffer comprises an event start offset for each of a one or more event segments, and wherein the second event processing buffer comprises event dispatch information for the each of the one or more event segments;
       second obtaining code configured to cause the at least one processor to obtain one or more new event segments associated with media data;
       first spitting code configured to cause the at least one processor to split the one or more event segments in the first event processing buffer and the second event processing buffer based on event duration of the one or more new event segments;
       first overwriting code configured to cause the at least one processor to overwrite the one or more event segments in the first event processing buffer and the second event processing buffer based on the event duration of the one or more new event segments; and
       first dispatching code configured to cause the at least one processor to dispatch the one or more event segments and the one or more new event segments based on the first event processing buffer and the event dispatch information in the second event processing buffer.

12. The apparatus according to claim 11, further comprising:
    first appending code configured to cause the at least one processor to append the one or more event segments to the first event processing buffer based on a time at which the each of the one or more event segments is appended to the first event processing buffer.

13. The apparatus according to claim 11, wherein the event dispatch information comprises information indicating at least one of event initialization, event appending, event purging, event duration, or event overwrite.

14. The apparatus according to claim 11, further comprising
    second appending code configured to cause the at least one processor to append the one or more event segments to the second event processing buffer based on duplicating the appending of the one or more event segments to the first event processing buffer.

15. The apparatus according to claim 14, wherein the appending of the one or more event segments to the second event processing buffer is based on the event dispatch information for the each of the one or more event segments.

16. The apparatus according to claim 11, wherein the first dispatching code further comprises:
    first determining code configured to cause the at least one processor to determine whether the one or more event segments or the one or more new event segments is included in a dispatch event table; and
    second dispatching code configured to cause the at least one processor to, based on determining that the one or more event segments or the one or more new event segments is not included in the dispatch event table, dispatch the one or more event segments or the one or more new event segments to an application.

17. The apparatus according to claim 11, further comprising:
    first addition code configured to cause the at least one processor to add the one or more event segments and the one or more new event segments to a dispatch event table, after dispatching the one or more event segments and the one or more new event segments.

18. The apparatus according to claim 12, wherein the appending of the one or more event segments to the first event processing buffer causes the each of the one or more event segments to align respective presentation time and duration of the each of the one or more event segments with respective presentation time and duration of at least one associated media sample in a media buffer.

19. The apparatus according to claim 11, wherein the first overwriting code further comprises:
- second determining code configured to cause the at least one processor to determine that the one or more event segments in the first event processing buffer are not associated with a same media segment;
- first deleting code configured to cause the at least one processor to delete the one or more event segments from the second event processing buffer;
- second deleting code configured to cause the at least one processor to delete the one or more event segments from the first event processing buffer; and
- third appending code configured to cause the at least one processor to append the one or more new event segments to the first event processing buffer and the second event processing buffer.

20. A non-transitory computer readable medium storing a program causing a computer to execute a process, the process comprising:
- obtaining a first event processing buffer and a second event processing buffer, wherein the first event processing buffer comprises an event start offset for each of a one or more event segments, and wherein the second event processing buffer comprises event dispatch information for the each of the one or more event segments;
- obtaining one or more new event segments associated with media data;
- splitting the one or more event segments in the first event processing buffer and the second event processing buffer based on event duration of the one or more new event segments;
- overwriting the one or more event segments in the first event processing buffer and the second event processing buffer based on the event duration of the one or more new event segments; and
- dispatching the one or more event segments and the one or more new event segments based on the first event processing buffer and the event dispatch information in the second event processing buffer.

* * * * *